United States Patent
Matsumoto

[19]

[11] Patent Number: 6,130,826
[45] Date of Patent: Oct. 10, 2000

[54] SWITCHING POWER SUPPLY WITH AUXILIARY POWER SUPPLY DEVICE FOR INITIALIZATION

[75] Inventor: Tadahiko Matsumoto, Yokohama, Japan

[73] Assignee: Murata Manufacturing Co., Ltd., Japan

[21] Appl. No.: 09/458,182

[22] Filed: Dec. 7, 1999

[30] Foreign Application Priority Data

Dec. 9, 1998 [JP] Japan ................... 10-350304

[51] Int. Cl.$^7$ ............ H02M 3/335; H02M 7/44; H02H 7/122
[52] U.S. Cl. ................. 363/20; 363/56; 363/95
[58] Field of Search ................ 363/20, 21, 95, 363/97, 131, 50, 55, 56

[56] References Cited

U.S. PATENT DOCUMENTS

| | | | |
|---|---|---|---|
| 4,441,147 | 4/1984 | Schwarz | 363/21 |
| 4,710,795 | 12/1987 | Yamada et al. | 363/21 |
| 4,722,041 | 1/1988 | Ishikawa | 363/18 |
| 4,942,508 | 7/1990 | Nakamura | 363/19 |
| 5,392,206 | 2/1995 | Peterson et al. | 363/19 |
| 5,631,811 | 5/1997 | Huh | 363/21 |

*Primary Examiner*—Peter S. Wong
*Assistant Examiner*—Bao Q. Vu
*Attorney, Agent, or Firm*—Ostrolenk, Faber, Gerb & Soffen, LLP

[57] ABSTRACT

A switching power supply is provided which is capable of supplying a stable voltage to a control circuit with high precision so as to enable an electronic part that does not have a high voltage tolerance to be used in the control circuit, and which enhances efficiency by providing a circuit configuration with a reduced power loss. The auxiliary power supply circuit of the switching power supply is configured such that, to a primary power supply, a series circuit including a first resistor, a voltage element, and a Zener diode; and a series circuit including a second resistor, a first transistor, a second transistor; and a control circuit of a switching element, are connected in parallel to each other. The input terminal of the first transistor is connected to the connection point of the first resistor and the voltage element, the input terminal of the second transistor is connected to the connection point of the voltage element and the Zener diode. The auxiliary power supply that operates the control circuit during steady-state is connected between the connection point of the first transistor and the second transistor and the reference terminal of the primary power supply.

10 Claims, 3 Drawing Sheets

SWITCHING POWER SUPPLY WITH AUXILIARY POWER SUPPLY DEVICE FOR INITIALIZATION

BACKGROUND OF THE INVENTION

1. Field of the Invention

The present invention relates to a switching power supply for supplying power that is provided to a load by turning a switching element on and off according to a control circuit.

2. Description of the Related Art

As a conventional switching power supply, a switching power supply 30 disclosed in Japanese Unexamined Patent Publication No. 5-260732, and in particular an auxiliary power supply circuit thereof, will be described with reference to FIG. 5.

A series circuit including a Zener diode Zd and a resistor R3 is connected to both terminals of a direct current (DC) primary power supply E. A PNP transistor Q6 that constitutes a start switching circuit s1, and a PNP transistor Q7 that constitutes a steady-state-operation switching circuit s2 are connected such that the emitters thereof are commonly connected to a negative terminal of a control circuit s3. Further, a positive terminal of this control circuit s3 is connected to a positive terminal of the primary power supply E.

The base of the transistor Q6 is directly connected to the connection point of the Zener diode Zd and the resistor R3, and the base of the transistor Q7 is also connected thereto through a diode D7. Accordingly, this diode D7 is connected between the bases of the transistors Q6 and Q7. Further, the collector of the transistor Q6 is connected to a negative terminal of the primary power supply E through a resistor R4. Moreover, the collector of the transistor Q7 is connected to a negative terminal of a DC auxiliary power supply V. Furthermore, a resistor R5 is connected between the base and collector of the transistor Q7.

A power conversion circuit p1 includes a switching element, a transformer having primary, secondary and tertiary windings, and a rectifying/smoothing circuit. The DC output power of this power conversion circuit p1 is supplied to a load.

The auxiliary power supply V provides an output voltage by rectifying/smoothing a voltage induced at the tertiary winding of the transformer, set to a voltage lower than the primary power supply E, and supplies power to the control circuit s3 in place of the primary power supply E during steady-state operation. Because the auxiliary power supply V does not generate a voltage when the switching power supply 30 is initialized, power is supplied from the primary power supply E to the control circuit s3 by turning on the transistor Q6, which is used during initialization. After the switching power supply 30 is initialized, the transistor Q7 is turned on, and the transistor Q6 is turned off as the voltage of the auxiliary power supply V connected to the collector of the transistor Q7 becomes equal to or more than a certain value, and stable power is thereby supplied to the control circuit s3 from the auxiliary power supply V through the transistor Q7 in place of the primary power supply E.

This switching-on operation from the transistor Q6 to the transistor Q7 is performed by utilizing the formed voltage drop of approximately 0.7 V across the diode D7 that is connected between the base of the transistor Q6 and the base of the transistor Q7.

As described above, the reason why power is supplied to the control circuit s3 from the primary power supply E during initialization, and power is supplied by switching to the auxiliary power supply V after the initialization is complete is that an operating voltage of the control circuit s3 is lower than the voltage of the primary power supply E. If, without switching, the power were always supplied from the primary power supply E to the control circuit s3, the power loss of the transistor Q6 becomes larger. Accordingly, during steady-state operation, the voltage is lower than the primary power supply B, and by supplying power to the control circuit s3 through the transistor Q7 from the auxiliary power supply V that generates a voltage larger than the voltage required for the control circuit s3, the power loss of the switching power supply 30 is reduced.

However, in an auxiliary power supply circuit (a circuit comprising auxiliary power supply V, the transistors Q6 and Q7 etc.) of the conventional switching power supply 30, since an electrical potential difference of about 0.7 V is applied between the base of the transistor Q6 and the base of the transistor Q7, the transistor Q7 turns on when the transistor Q6 turns on, and thus the voltage applied to the control circuit s3 is about 0.7 V lower than at the time when the transistor Q6 turns off.

Accordingly, as the switching power supply 30 is in a steady-state operation, i.e., in the state where the transistor Q6 turns on and the transistor Q7 turns off, the output current of the switching power supply 30 becomes overloaded and an over-current protection circuit (not shown) operates, and when the output voltage of the switching power supply 30 is lowered, an output voltage of the tertiary winding of the auxiliary power supply V is also lowered, and thus the transistor Q6 turns on again and the power is supplied from the primary power supply E, thereby lowering the voltage of the control circuit s3 by about 0.7 V from that during normal operation.

When the current from the switching power supply 30 is overloaded, a current of the switching element is also larger, and thus it is necessary to supply a sufficient driving voltage to a gate of the switching element. However, in the auxiliary power supply circuit of the conventional switching power supply 30, a voltage applied to the control circuit s3 is lowered by about 0.7 V during over-current protection operation, and thereby there is a problem in that a gate driving voltage of the switching element is also lowered by about 0.7 V, and thus sufficient power is not supplied to the load.

Accordingly, in the auxiliary power supply circuit of the conventional switching power supply 30, in order to prevent a drop in the gate driving voltage of the switching element during over-current protection operation, it is necessary to set the operating voltage of the control circuit s3 during steady-state operation to a value which is higher by that amount. As a result, electronic parts that do not have a high voltage tolerance may not be used in the control circuit s3.

For example, when the control circuit s3 of the switching power supply 30 is constructed by using a low-cost high-speed logic gate IC, since an absolute maximum rated voltage of the high-speed logic gate IC is usually only about 7 V, and by setting the voltage of the control circuit s3 higher to obtain a sufficient gate driving voltage of the switching element, a voltage derating during steady-state operation, in which the voltage rises about 0.7 V, cannot be secured.

SUMMARY OF THE INVENTION

Accordingly, it is an object of the present invention to provide a switching power supply which is capable of supplying a stable voltage to a control circuit with high precision so as to enable an electronic part that does not have a high voltage tolerance to be used in the control circuit, and which enhances efficiency by allowing a reduced power loss circuit configuration to be made.

The above and other objects of the present invention can be achieved by a switching power supply comprising a power conversion circuit for converting power supplied from a primary power supply to power a load and further comprising an auxiliary power supply; a control circuit for controlling an operation of the power conversion circuit; and an auxiliary power supply circuit for supplying power to the control circuit by conducting a switching operation to supply power from the primary power supply during initialization and to supply power from the auxiliary power supply during steady-state operation. The auxiliary power supply circuit comprises a fixed bias circuit for forming a first bias voltage from a voltage across the primary power supply and a second bias voltage having a voltage higher than the first bias voltage, a second transistor for making the first bias voltage an operation starting voltage, and a first transistor connected in series to the second transistor for making the second bias voltage an operation starting voltage. The auxiliary power supply is connected to a connection point of the first transistor and the second transistor. When a voltage difference between the second bias voltage and an output voltage of the auxiliary power supply becomes equal to or less than a switching voltage, power is supplied from the auxiliary power supply to the control circuit through the second transistor.

According to an aspect of the invention, in the switching power supply, the fixed bias circuit comprises a series circuit comprising a biasing resistor, a voltage element, and a Zener diode. The Zener diode provides the first bias voltage, and an added voltage of the Zener diode and the voltage element provides the second bias voltage. A base of the first transistor is connected to a connection point of the biasing resistor and the voltage element, and a base of the second transistor is connected to a connection point of the voltage element and the Zener diode. The control circuit is connected to an emitter of the second transistor, and an output terminal of the auxiliary power supply is connected to a connection point of an emitter of the first transistor and a collector of the second transistor. The auxiliary power supply provides power that is obtained by rectifying and smoothing a voltage induced in an auxiliary winding of the power conversion circuit.

The invention supplies power to the control circuit through the first transistor and the second transistor from the primary power supply during initialization of the switching power supply. The control circuit controls a conduction time of the primary power supply by duty-controlling or frequency-controlling the switching element of the power conversion circuit, and controls an output voltage of the switching power supply to be a certain voltage. Power is supplied to the control circuit through the second transistor from the auxiliary power supply, of a voltage less than that of the primary power supply, during steady-state operation of the switching power supply.

A switch-over from the primary power supply to the auxiliary power supply is performed by comparing a bias voltage V1 of the first transistor and an output voltage V2 of the auxiliary power supply connected to the connection point of the first transistor and the second transistor. If the voltage difference (V1–V2) is equal to or more than the switching voltage (e.g., 0.7 V), then both the first transistor and the second transistor conduct, thereby the power is supplied to the control circuit through the first transistor and the second transistor from the primary power supply.

Further, if the voltage difference (V1–V2) is equal to or less than the switching voltage, then the first transistor becomes non-conducting, and power is supplied to the control circuit through the second transistor from the auxiliary power supply.

Further, when the voltage of the auxiliary power supply is lowered during over-current operation, the first transistor again conducts and power is supplied to the control circuit through the first transistor and the second transistor from the primary power supply.

The voltage element may comprise a diode, a Zener diode, or a resistor.

When the voltage element is a diode, a predetermined bias voltage is obtained by a forward voltage drop thereof. When the voltage element is a Zener diode, the predetermined bias voltage is obtained by a Zener voltage thereof. When the voltage element is a resistor, the predetermined bias voltage is obtained by a voltage drop thereof.

Other features and advantages of the present invention will become apparent from the following description of the invention which refers to the accompanying drawings.

BRIEF DESCRIPTION OF THE DRAWING(S)

DESCRIPTION OF THE PREFERRED EMBODIMENTS

Figure 1:
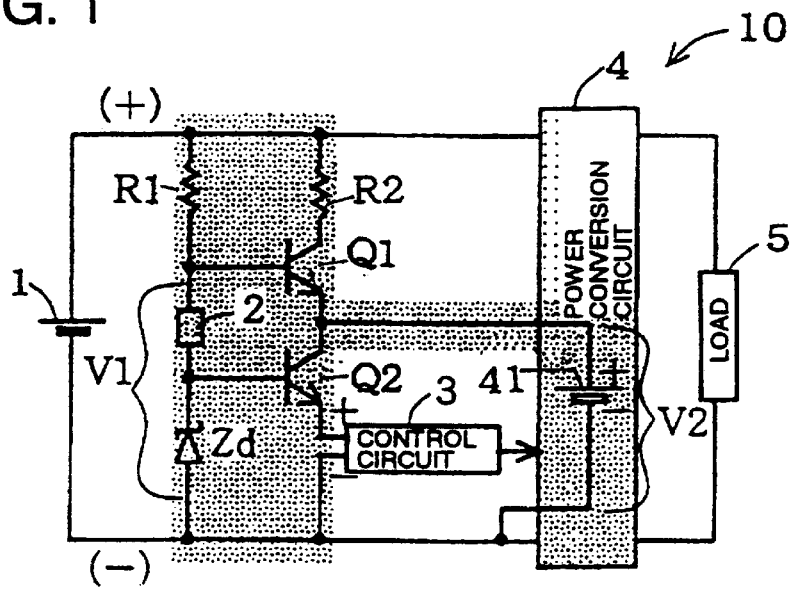
FIG. 1 is a diagram showing an auxiliary power supply circuit of a switching power supply according to a first embodiment of the present invention.

In the following, with reference to FIG. 1, a switching power supply 10 of a first embodiment according to the present invention will be described. The numeral 1 denotes a DC (Direct Current) primary power supply, and a fixed bias circuit comprising a series circuit comprising a biasing resistor R1, a voltage element 2, and a Zener-diode Zd is connected between a positive terminal and a negative terminal of this primary power supply 1. The primary power supply 1 can be DC voltage supplied by rectifying and filtering an AC source voltage. The negative terminal of the primary power supply 1 is a terminal that provides a reference electric potential (a ground potential). As will be described below, the voltage element 2 comprises a diode, a resistor, a Zener diode, etc. A forward voltage drop of the diode (about 0.7 V), a voltage drop of the resistor, or a Zener voltage of the Zener diode is utilized as a bias voltage.

Further, the collector of an NPN-type first transistor Q1 is connected to the positive terminal of the primary power supply 1 through a collector resistor R2, and the emitter thereof is connected to the collector of an NPN-type second transistor Q2. The connection point of the first transistor Q1 and the second transistor Q2 is connected to a positive terminal of an auxiliary power supply 41 that will be described below. A control circuit 3 is connected between the emitter of the transistor Q2 and the negative terminal of the primary power supply 1. The base of the first transistor Q1 is connected to a connection point of the biasing resistor R1 and the voltage element 2. Further, the base of the transistor Q2 is connected to a connection point of the voltage element 2 and the cathode of the Zener diode Zd. An output terminal of the control circuit 3 is connected an input terminal of a switching element (described below) of a power conversion circuit 4. The control circuit 3 duty-controls or frequency-controls the switching element of the power conversion circuit 4, controls a conduction time of the primary power supply 1, causes the power conversion circuit 4 to operate, and then controls the output voltage of the switching power supply to be a certain voltage.

The power conversion circuit 4, as described below, comprises a transformer having a primary winding, a secondary winding, and a tertiary winding (auxiliary winding); a switching element; a main rectifying/smoothing circuit; and a sub-rectifying/smoothing circuit. The auxiliary power supply 41 comprises a tertiary winding and a sub-rectifying/smoothing circuit. A positive terminal of the auxiliary power supply 41 is, as described above, connected to the connection point of the emitter of the first transistor Q1 and the collector of the second transistor Q2, and the negative terminal thereof is connected to a negative terminal of the primary power supply 1.

An auxiliary power supply circuit of the switching power supply 10 comprises the shaded region in FIG. 1. That is, it comprises the series circuit including the biasing resistor R1, the voltage element 2 and the Zener diode Zd, the collector resistor R2; the series circuit including the first transistor Q1 and the second transistor Q2; and the auxiliary power supply 41.

In the following, the operation of the auxiliary power supply circuit of the switching power supply 30 shown in FIG. 1 will be described. In FIG. 1, when a power supply switch that is not shown is turned on, a voltage of the primary power supply 1 is voltage-divided by the biasing resistor R1, the voltage element 2, and the Zener diode Zd. The Zener diode Zd provides a bias voltage Vz to the base of the second transistor Q2, and further an added voltage V1 of the Zener voltage Vz and the voltage across the voltage element 2 becomes a bias voltage at the base of the first transistor Q1, and thereby the first transistor Q1 and the second transistor Q2 conduct. The power is then supplied from the primary power supply 1 to the control circuit 3 through the collector resistor R2, the first transistor Q1, and the second transistor Q2, and thus the control circuit 3 starts, and the power conversion circuit 4 operates. With this operation, the main rectifying/smoothing circuit (described below) of the power conversion circuit 4 supplies the power to a load 5, and the auxiliary power supply 41 also starts, thereby increasing an output voltage thereof. Then, if the voltage difference (V1–V2) between an output voltage V2 of the auxiliary power supply 41 and the bias voltage V1 applied to the base of the first transistor Q1 becomes equal to or less than a switching voltage Vs (e.g., 0.7 V), the first transistor Q1 becomes non-conducting, and the power is supplied to the control circuit 3 from the auxiliary power supply 41 in place of the primary power supply 1. That is, if the voltage V2 of the auxiliary power supply 41 is lowered to be equal to or less than the bias voltage V1 of the first transistor Q1 by the switching voltage Vs, the power is supplied to the control circuit 3 from the primary power supply 1, and if the voltage V2 of the auxiliary power supply 41 is equal to or more than the bias voltage V1 by the switching voltage Vs, the power is supplied to the control circuit 3 from the auxiliary power supply 41 through transistor Q2.

As described above, the first transistor Q1 serves to select the power supply source to the control circuit 3 by comparing the bias voltage V1 and the output voltage V2 of the auxiliary power supply 41. With the switching operation of the first transistor Q1 described above, regardless of the operating mode of the switching power supply 10, i.e., whether power is supplied to the control circuit 3 from the primary power supply 1 or the auxiliary power supply 41, the second transistor Q2, in which the bias voltage is a certain Zener voltage, decides the supply voltage to the control circuit 3, whereby a certain stable voltage is applied to the control circuit 3. Accordingly, a part that does not have a high voltage tolerance and a part having a small tolerance may also be utilized in the control circuit 3.

As described above, during initialization, an initialization is secured by supplying the power to the control circuit 3 from the primary power supply 1, and during steady-state operation, power, of a voltage less than that of the primary power supply 1, is supplied to the control circuit 3 from the auxiliary power supply 41, thereby enabling power loss during steady-state operation to be reduced, and thus high-efficiency operation of the switching power supply is possible.

Figure 2:
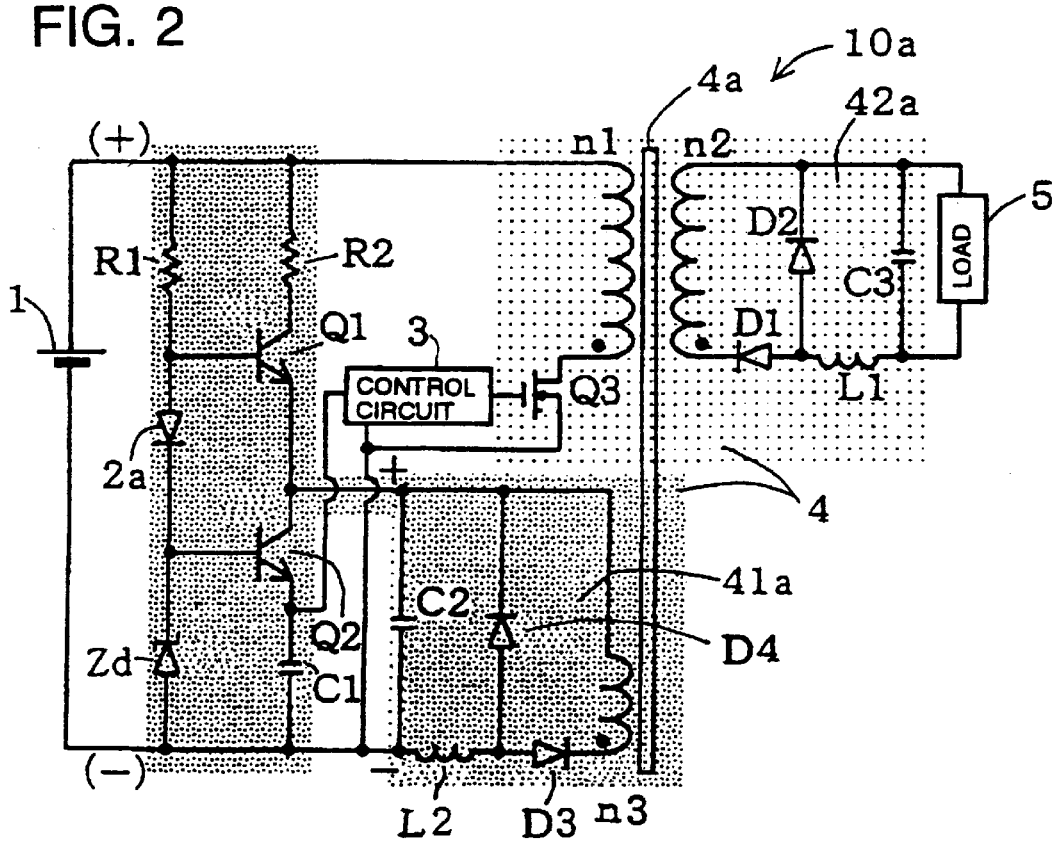
FIG. 2 is a diagram showing an auxiliary power supply circuit of a switching power supply according to a second embodiment of the present invention.

In the following, a switching power supply 10a applied to a forward converter of a constant voltage output, as one embodiment of the auxiliary power supply circuit of the switching power supply 10 shown in FIG. 1, will be described with reference to FIG. 2. In FIG. 2, the descriptions of the parts that are the same as in FIG. 1 will be omitted by labeling them with the same numbers. The numeral 2a denotes a diode, representing one concrete example of the voltage element 2 shown in FIG. 1, connected between the bases of the first transistor Q1 and the second transistor Q2, which makes the bias voltage of the first transistor Q1 higher than the bias voltage of the second transistor Q2 by about 0.7 V according to the forward voltage drop of the diode 2a.

The power conversion circuit 4 comprises a field effect transistor Q3 as a switching element; a transformer 4a including a primary winding n1, a secondary winding n2, and a tertiary winding n3; a main rectifying/smoothing circuit 42a; and a sub-rectifying/smoothing circuit 41a as a concrete example of the auxiliary power supply 41, including the above-mentioned third winding n3.

An output terminal of the control circuit 3 is connected to the gate of the transistor Q3. The drain of the transistor Q3 is connected to one end of the primary winding n1, and the source thereof is connected to the negative terminal of the primary power supply 1. The other end of the primary winding n1 is connected to the positive terminal of the primary power supply 1. The main rectifying/smoothing circuit 42a comprises a choke-input-type rectifying/smoothing circuit including diodes D1 and D2 connected to the secondary winding n2 side of the transformer 4a, an inductor L1, and a capacitor C3, and the circuit supplies DC power to the load 5.

Further, the sub-rectifying/smoothing circuit 41a has the same circuit configuration as the main rectifying/smoothing circuit 42a, and comprises a choke-input-type rectifying/smoothing circuit including diodes D3 and D4 connected to both ends of the tertiary winding n3 of the transformer 4a, an inductor L2, and a capacitor C2. An end of the tertiary winding n3 is connected to a connection point of the emitter of the first transistor Q1 and the collector of the second transistor Q2, as an output terminal on the positive side of the rectifying/smoothing circuit 41a; and another end of the tertiary winding n3 is connected to the negative terminal of the primary power supply 1 through the rectifying diode D3 and the choke coil L2 of the rectifying/smoothing circuit 41a. With this circuit configuration, power during steady-state operation is supplied to the control circuit 3 through the second transistor Q2.

The operation of the auxiliary power supply circuit of the switching power supply 10a according to the present embodiment is the same as that according to the embodiment shown in FIG. 1. However, when an output voltage is lowered when an over-current protection circuit (not shown) actuates when the current output of the switching power supply 10a overloads, an output voltage of the tertiary winding (auxiliary winding) n3 is also lowered in proportion thereto, thereby an output voltage of the rectifying/smoothing circuit 41a (auxiliary power supply 41) drops. As a result, power is supplied to the control circuit 3 from the primary power supply 1 as the first transistor Q1 turns on. However, even in this operation mode, the supply voltage to the control circuit 3 is stabilized by the second transistor Q2, and thus it is not different from that during steady-state operation.

Figure 3:
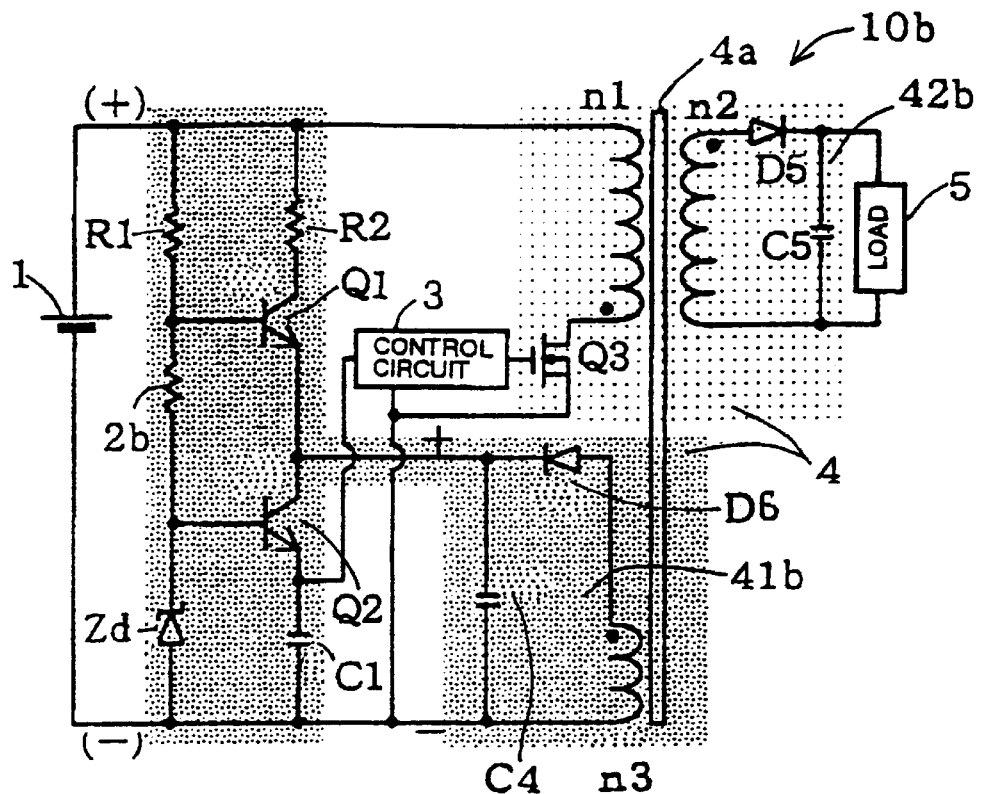
FIG. 3 is a diagram showing an auxiliary power supply circuit of a switching power supply according to a third embodiment of the present invention.

In the following, as another concrete embodiment of the auxiliary power supply circuit of the switching power supply 10 shown in FIG. 1, an auxiliary power supply circuit of a switching power supply 10b that is applied to a fly-back converter with a constant voltage output will be described with reference to FIG. 3. In FIG. 3 the figure, a description of the parts that are the same as in FIG. 1 will be omitted by labeling them with the same numbers. The numeral 2b denotes a biasing resistor, representing another concrete example of the voltage element 2 shown in FIG. 1, connected between the bases of the first transistor Q1 and the second transistor Q2, which makes the bias voltage of the first transistor Q1 higher than the bias voltage of the second transistor Q2 by a certain voltage, which is the voltage drop of the biasing resistor 2b.

The power conversion circuit 4 comprises a field effect transistor Q3 as a switching element; a transformer 4a including a primary winding n1, a secondary winding n2 and a tertiary winding n3; a main rectifying/smoothing circuit 42b; and a sub-rectifying/smoothing circuit 41b as another concrete example of the auxiliary power supply 41.

The form of connection of the field effect transistor Q3 is the same as the embodiment described in FIG. 2. The main rectifying/smoothing circuit 42b comprises of a capacitor-input-type rectifying/smoothing circuit including a diode D5 connected to the secondary winding n2 side of the transformer 4a, and a capacitor C5, and the circuit supplies DC power to the load 5.

Further, the sub-rectifying/smoothing circuit 41b has the same circuit configuration as the main rectifying/smoothing circuit 41b, and comprises a capacitor-input-type rectifying/smoothing circuit including a diode D6 connected to the tertiary winding n3 side of the transformer 4 and a capacitor C4. One end of the tertiary winding n3 is connected to a connection point of the emitter of the first transistor Q1 and the collector of the second transistor Q2, through the diode D6, as an output terminal on the positive side of the rectifying/smoothing circuit 41b; and the other end of the tertiary winding n3 is connected to a negative terminal of the primary power supply 1. With this circuit configuration, power during steady-state operation is supplied to the control circuit 3 through the second transistor Q2. The operation of the auxiliary power supply circuit of the switching power supply 10b according to the present embodiment is the same as that of the embodiments shown in FIGS. 1 and 2.

Figure 4:
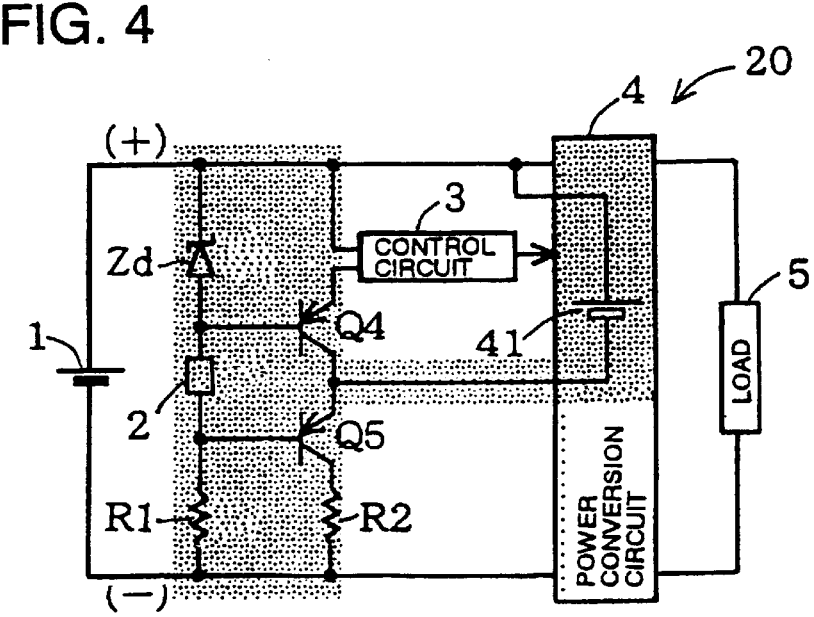
FIG. 4 is a diagram showing an auxiliary power supply circuit of a switching power supply according to a fourth embodiment of the present invention.
Figure 5:
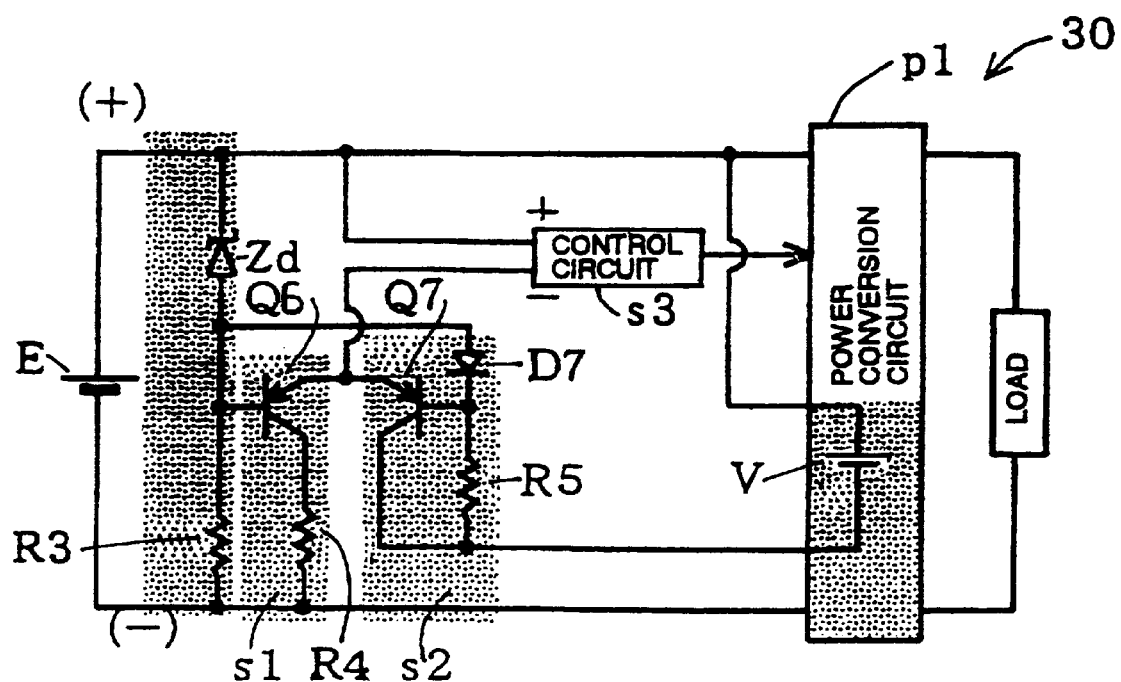
FIG. 5 is a diagram showing an auxiliary power supply circuit of a conventional switching power supply.

In the following an auxiliary power supply circuit of a switching power supply 20 according to another embodiment of the present invention will be described with reference to FIG. 4. The embodiment shown in FIG. 4 uses a PNP-type transistor as the first transistor Q4 and the second transistor Q5 in contrast to the embodiment shown in FIG. 1 that uses NPN-type transistors, and the positive terminal side of the primary power supply 1 is made a reference electric potential (ground electric potential). Describing the points that differ from the circuit shown in FIG. 1, the cathode of the Zener diode Zd is connected to the positive terminal of the primary power supply 1, and a biasing resistor R1 is connected to the negative terminal of the primary power supply 1. Further, the control circuit 3 is connected between the positive terminal of the primary power supply 1 and the emitter of the transistor Q4, and the collector resistor R2 is connected between the collector of the transistor Q5 and the negative terminal of the primary power supply 1. The negative terminal of the auxiliary power supply 41 is connected to a connection point of the collector of the transistor Q4 and the emitter of the transistor Q5. The operation of the present embodiment is the same as that of the embodiment shown in FIG. 1.

In the above-mentioned embodiments, as the voltage element 2, the diode 2a and the resistor 2b are illustrated, but a Zener diode may be used instead.

Further, the present invention is applicable to a non-isolating type DC—DC converter such as a back-converter or an inverter.

Moreover, the first transistor Q1 and the second transistor Q2 may be field effect transistors.

The present invention supplies power from the primary power supply to the control circuit, during initialization of the switching power supply or during over-current operation. Accordingly, initialization of the switching power supply is secured. Power is supplied to the control circuit from the auxiliary power supply that has a power lower than the primary power supply during steady-state operation, and thus the power loss during steady-state operation can be reduced, thereby enabling the efficiency of the switching power supply to be enhanced.

Further, although the first transistor and the second transistor are connected in series, it is configured that the power supply to the control circuit is determined by the second transistor which is always biased by the Zener diode, and thus, regardless of the operation mode of the switching power supply, a constant, stable voltage is supplied to the control circuit, thereby an electronic part that does not have a high voltage tolerance can be used in the control circuit.

Moreover, by using a common Zener diode as the inputs of the first transistor and the second transistor, the number of parts can be reduced, and an influence of the variation of the Zener voltage of the Zener diode may be removed.

The invention enables the bias voltage to be set simply and easily.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A switching power supply, comprising:

a power conversion circuit for converting power supplied from a primary power supply to power a load and further comprising an auxiliary power supply;

a control circuit for controlling operation of said power conversion circuit; and an auxiliary power supply circuit for supplying power to said control circuit by conducting a switching operation to supply power from said primary power supply during initialization, and to supply power from said auxiliary power supply during steady-state operation, wherein said auxiliary power supply circuit comprises:

a fixed bias circuit for forming a first bias voltage from a voltage across said primary power supply and a second bias voltage having a voltage higher than said first bias voltage;

a second transistor for making said first bias voltage an operation starting voltage; and a first transistor connected in series to said second transistor for making said second bias voltage an operation starting voltage;

wherein said auxiliary power supply is connected to a connection point of said first transistor and said second transistor; and wherein, when a voltage difference between said second bias voltage and an output voltage of said auxiliary power supply becomes equal to or less than a switching voltage, power is supplied from said auxiliary power supply to said control circuit through said second transistor.

2. The switching power supply of claim 1, wherein:

said fixed bias circuit comprises a series circuit comprising a biasing resistor, a voltage element, and a Zener diode, said Zener diode providing said first bias voltage, and an added voltage of said Zener diode and said voltage element providing said second bias voltage;

a base of said first transistor being connected to a connection point of said biasing resistor and said voltage element;

a base of said second transistor being connected to a connection point of said voltage element and the Zener diode;

said control circuit being connected to an emitter of said second transistor;

an output terminal of said auxiliary power supply being connected to a connection point of an emitter of said first transistor and a collector of said second transistor; and said auxiliary power supply providing power that is obtained by rectifying and smoothing a voltage induced at an auxiliary winding of said power conversion circuit.

3. The switching power supply of claim 1, wherein said voltage element comprises one of a diode, a Zener diode and a resistor.

4. The switching power supply of claim 2, wherein said voltage element comprises one of a diode, a Zener diode and a resistor.

5. A switching power supply, comprising:

a power conversion circuit for converting power supplied from a primary power supply to power a load and further comprising an auxiliary power supply;

a control circuit for controlling operation of said power conversion circuit; and an auxiliary power supply circuit for supplying power to said control circuit by conducting a switching operation to supply power from said primary power supply during initialization, and to supply power from said auxiliary power supply during steady-state operation, wherein said auxiliary power supply circuit comprises:

a bias circuit for forming a first bias voltage from a voltage across said primary power supply and a second bias voltage having a voltage higher than said first bias voltage;

a second switch for making said first bias voltage an operation starting voltage; and a first switch for making said second bias voltage an operation starting voltage;

wherein said auxiliary power supply is connected to said first switch and said second switch; and wherein, when a voltage difference between said second bias voltage and an output voltage of said auxiliary power supply becomes equal to or less than a switching voltage, power is supplied from said auxiliary power supply to said control circuit through said second switch.

6. The switching power supply of claim 5, wherein the first switch is connected in series with the second switch and the auxiliary power supply is connected to a connection point of the first switch and said second switch.

7. The switching power supply of claim 6, wherein:

said bias circuit comprises a series circuit comprising a biasing resistor, a voltage element, and a Zener diode, said Zener diode providing said first bias voltage, and an added voltage of said Zener diode and said voltage element providing said second bias voltage.

8. The switching power supply of claim 7, wherein the first and second switches comprise first and second transistors, respectively, and further wherein:

a base of said first transistor is connected to a connection point of said biasing resistor and said voltage element;

a base of said second transistor is connected to a connection point of said voltage element and the Zener diode;

said control circuit being connected to an emitter of said second transistor;

an output terminal of said auxiliary power supply being connected to a connection point of an emitter of said first transistor and a collector of said second transistor; and said auxiliary power supply providing power from said power conversion circuit.

9. The switching power supply of claim 8, wherein the power conversion circuit has a transformer comprising a primary winding, a secondary winding and an auxiliary winding, the auxiliary power supply providing power by rectifying and smoothing a voltage induced at the auxiliary winding of said transformer of said power conversion circuit.

10. The switching power supply of claim 7, wherein said voltage element comprises one of a diode, a Zener diode and a resistor.

* * * * *